(12) United States Patent
Ho

(10) Patent No.: US 7,583,452 B2
(45) Date of Patent: Sep. 1, 2009

(54) BARREL FOR PROMOTING ALIGNMENT OF OPTICAL AXES OF LENSES

(75) Inventor: Hung-Lung Ho, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/865,628

(22) Filed: Oct. 1, 2007

(65) Prior Publication Data

US 2008/0158697 A1 Jul. 3, 2008

(30) Foreign Application Priority Data

Dec. 29, 2006 (CN) .......................... 2006 1 0064639

(51) Int. Cl.
*G02B 7/02* (2006.01)
*G02B 15/14* (2006.01)
(52) U.S. Cl. ...................... 359/811; 359/694; 359/695
(58) Field of Classification Search .......... 359/694–824
See application file for complete search history.

(56) References Cited

U.S. PATENT DOCUMENTS 5,264,963 A * 11/1993 Ueyama ...................... 359/695
5,697,005 A * 12/1997 Kikuchi ...................... 396/535
6,497,520 B2  12/2002 Omiya ........................ 396/411

FOREIGN PATENT DOCUMENTS

CN          2490594 Y         5/2002

* cited by examiner

*Primary Examiner*—Mohammed Hasan
(74) *Attorney, Agent, or Firm*—Frank R. Niranjan

(57) ABSTRACT

A barrel is configured for receiving the plurality of lenses therein and for automatically aligning respective optical axes of the plurality of lenses. At least one protruding rib is formed on an internal surface of the barrel and extends along/from the internal surface of the barrel, in a direction parallel to an axis of the barrel. The protruding rib is configured for elastically supporting the plurality of lenses there against and for automatically aligning the respective optical axes of the plurality of lenses.

14 Claims, 5 Drawing Sheets

BARREL FOR PROMOTING ALIGNMENT OF OPTICAL AXES OF LENSES

BACKGROUND OF THE INVENTION

1. Field of the Invention

The present invention relates to a barrel for aligning optical axes of a plurality of lenses and, particularly, to a barrel capable of automatically aligning respective optical axes of a plurality of lenses.

2. Description of Related Art

Presently, with the development of optical imaging technology, digital cameras, video cameras, and portable electronic devices (e.g., mobile phones, PDAs (personal digital assistants), and portable computers) incorporating cameras are now widely used. More and more consumers desire a higher image quality produced using such camera modules.

A typical camera module generally includes a lens module. The lens module is coupled with an image sensor, such as a charge coupled device (CCD) or a complementary metal oxide semiconductor (CMOS), so as to capture images. Generally, the lens module includes a holder and a barrel threadedly received in the holder. A plurality of lenses and spacers are arranged in alternating fashion in the barrel. In addition, an infrared-cut filter that blocks light in the infrared spectrum often is also fitted in the lens module to prevent interference. Before the acceptable lens module can be sold, imaging quality of the lens module, after assembly thereof, must be ensured. Accordingly, concentricity of the lenses must be detected in order to ensure of the quality of the camera. How, consistently, to align the respective optical axes of the plurality of lenses in the barrel has proven a critical problem for operators/assemblers.

Generally, a tolerance between a diameter of the lens and an internal diameter of the barrel is considered a vital factor in controlling deviation in a position of an optical axis of the lens. Conventionally, the lenses are installed, in a desired order, into the barrel by operators or a special machine. During assembly of the lenses, the position of the respective optical axis of each lens cannot be precisely controlled due to clearance between the lens and the barrel. Therefore, a deviation between the respective optical axes can result, and, as a result, an image resolution of the lens module can suffer to some degree. Referring to FIG. 5, after a first lens 12, a second lens 14, and a third lens 16 have been installed into a barrel 10, there still is clearance between the first, second, and third lenses 12, 14, 16 and the barrel 10. As a result, the optical axes of the first, second, and third lenses 12, 14, 16 are non-concentric (i.e., not aligned). Thus, after the lens module has been installed, image resolution and the ratio of acceptable products tend to be dramatically reduced. Given that unfavorable ratio, the effective manufacturing cost is correspondingly increased (i.e., to achieve a sufficient number of acceptable units).

What is needed, therefore, is a barrel for automatically aligning the respective optical axes of a plurality of lenses to thereby overcome the above-mentioned disadvantages.

SUMMARY OF THE INVENTION

In a present embodiment, a barrel is configured for receiving the plurality of lens therein and for automatically aligning respective optical axes of the plurality of lenses. At least one protruding rib is formed on an internal surface of the barrel and extends along the internal surface of the barrel, in a direction parallel to an axis of the barrel. The at least one protruding rib elastically supports the plurality of lenses there against and automatically aligns the respective optical axes of the plurality of lenses.

Advantages and novel features will become more apparent from the following detailed description when taken in conjunction with the accompanying drawings.

BRIEF DESCRIPTION OF THE DRAWINGS

Many aspects of the barrel for promoting alignment of optical axes of lenses can be better understood with reference to the following drawings. The components in the drawings are not necessarily drawn to scale, the emphasis instead being placed upon clearly illustrating the principles of the present barrel. Moreover, in the drawings, like reference numerals designate corresponding parts throughout the several views.

DETAILED DESCRIPTION OF THE INVENTION

Embodiments will now be described in detail below and with reference to the drawings.

Figure 1:
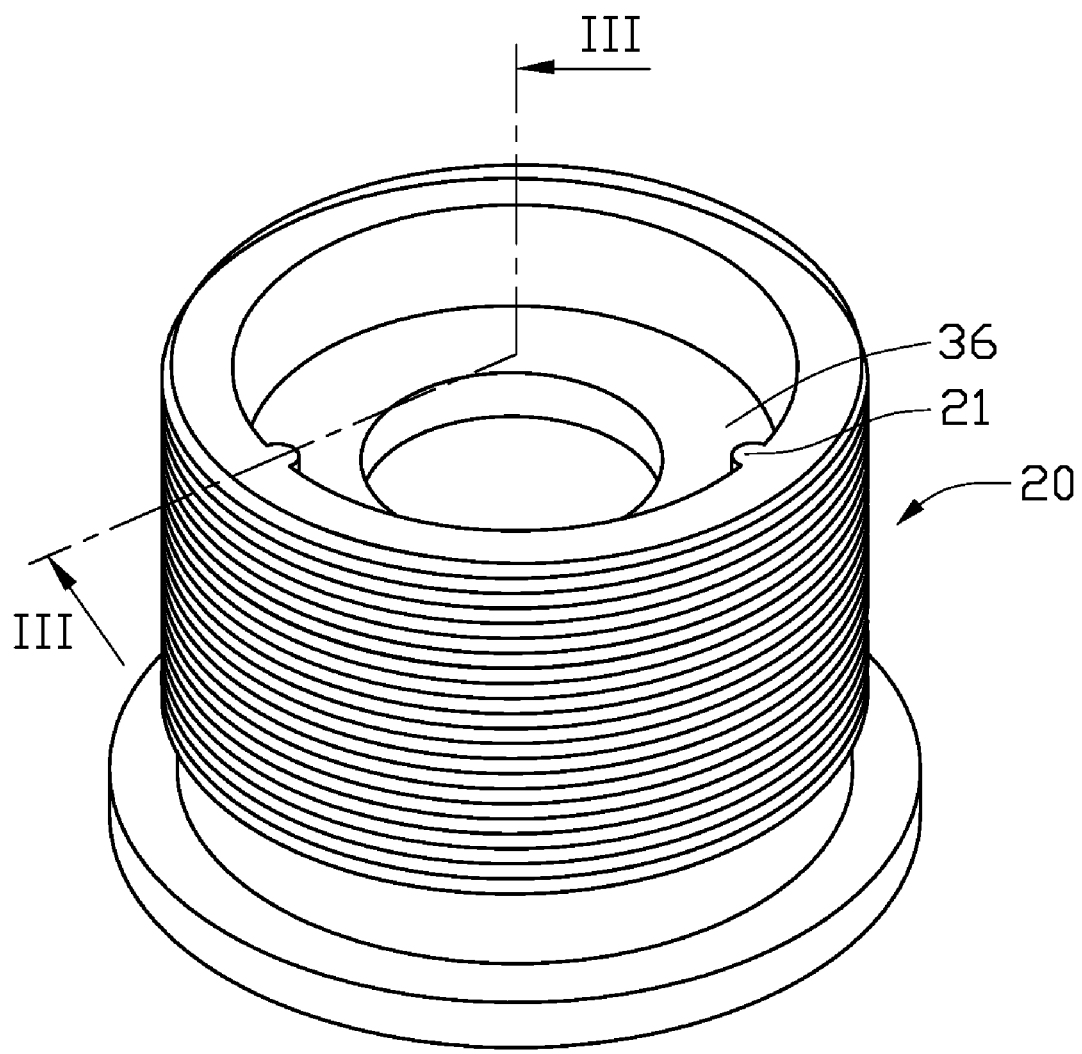
FIG. 1 is a perspective view of a barrel for aligning respective optical axes of a plurality of lenses received in the barrel, according to a first embodiment.
Figure 2:
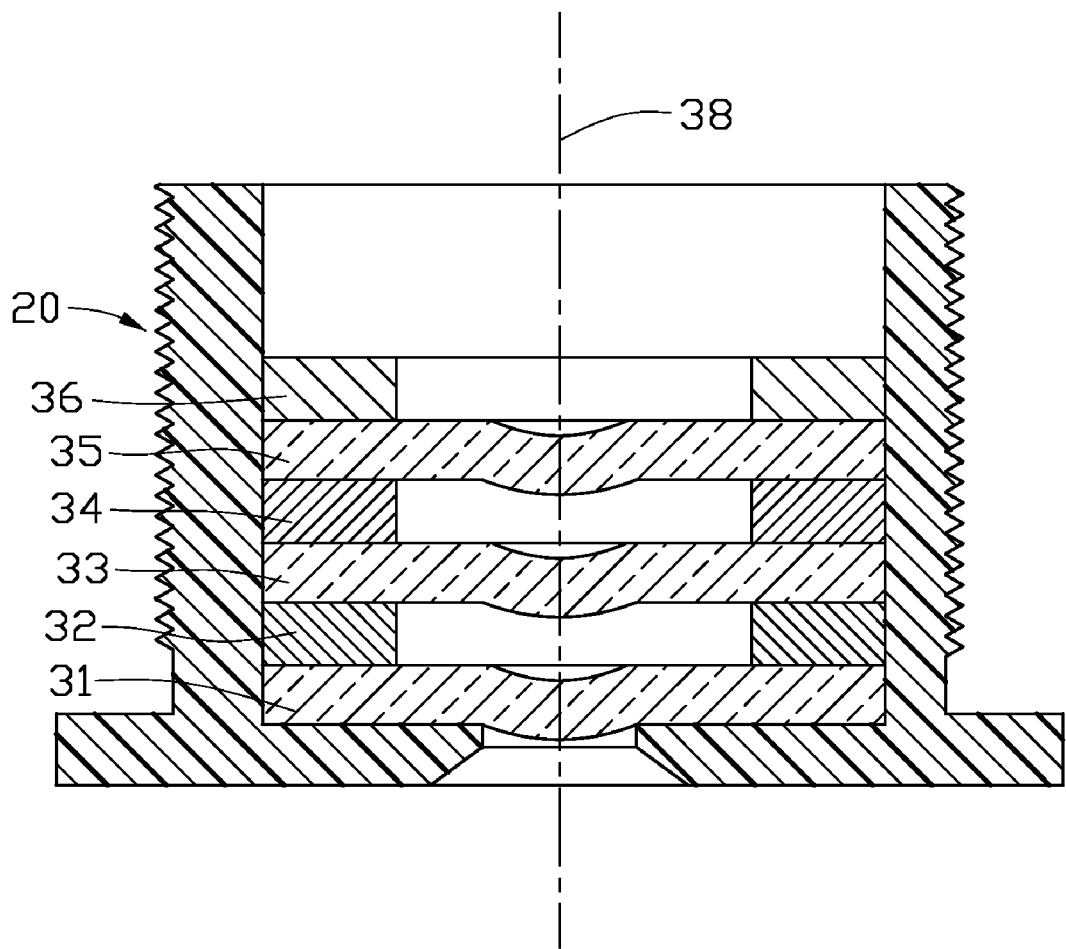
FIG. 2 is a sectional view taken along line III-III of FIG. 1.

Referring to FIGS. 1 and 2, a barrel 20 for automatically aligning respective optical axes of a plurality of lenses 31, 33 35, according to a first present embodiment, is provided. The barrel 20 includes an outside screw thread thereon. The barrel 20 has a main body, usefully, made from engineering plastics, such as polycarbonate. The barrel 20 is threadedly mounted on a holder (not shown) via the outside screw thread of the barrel 20. A pair of elongated and elastic protruding ribs 21, extending parallel to an axis 24 of the barrel 20, is formed directly on (e.g., co-molded with) an inner side of the barrel 20. A cross section of each of the protruding ribs 21 is configured to be a semicircular or arcuate shape, so as not to promote scratching of a given lens 31, 33, 35. A first imaginary line is formed by linearly connecting one of the protruding ribs 21 and the axis 24 of the barrel 20. Similarly, a second imaginary line is formed by straightly/linearly connecting the other respective protruding rib 21 and the axis 24 of the barrel 20. An included angle between the first imaginary line and the second imaginary line, advantageously more than zero degrees (i.e., a distinguishable angle is defined) but less than 180 degrees. Rather suitably, the included angle can be, approximately, between 60 degrees and 150 degrees, and, quite appropriately, it should be about 120 degrees (referring to FIG. 4). While it is advantageous to employ two protruding ribs 21, it is to be understood that other numbers thereof could potentially be provided and be within the scope of the present barrel.

Figure 3:
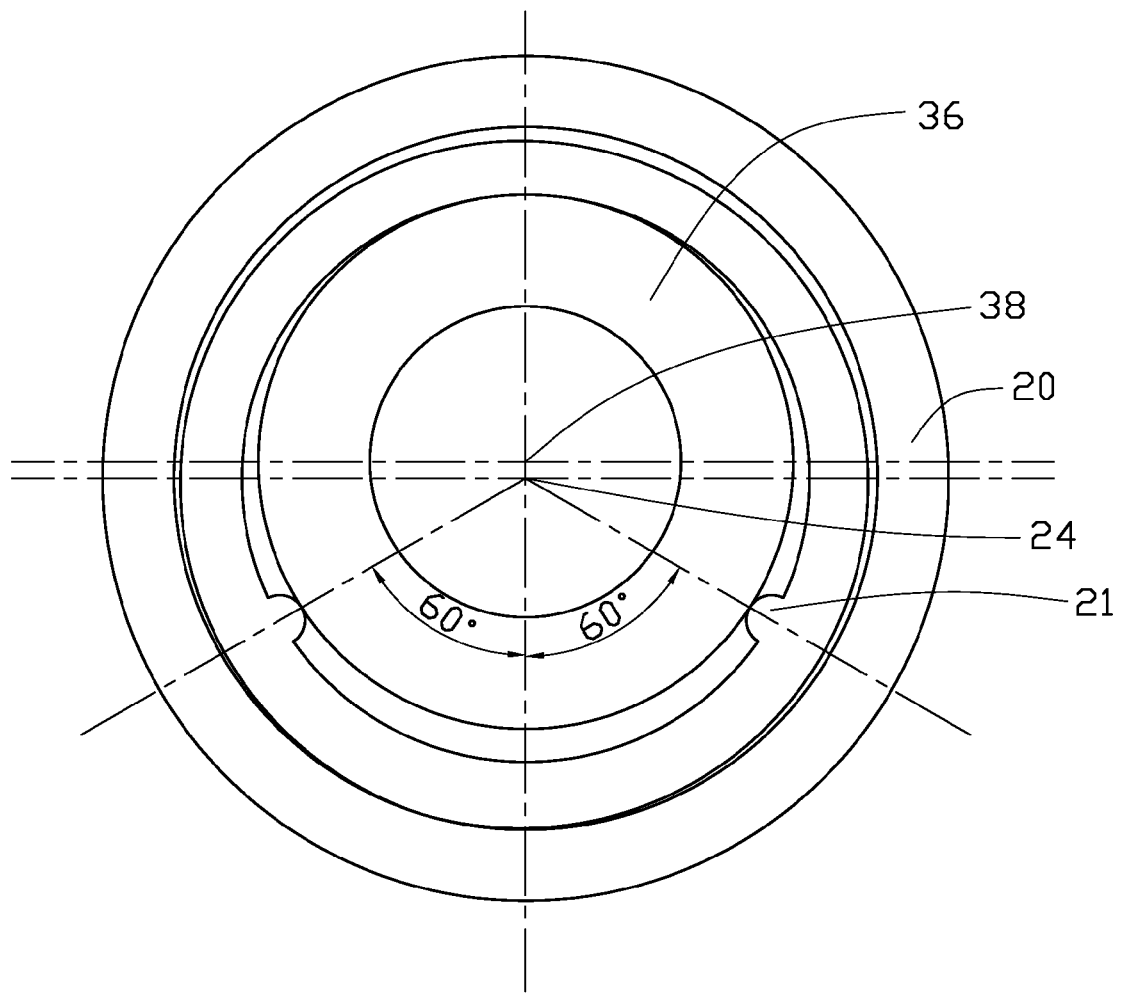
FIG. 3 is an enlarged, top view of FIG. 1.
Figure 4:
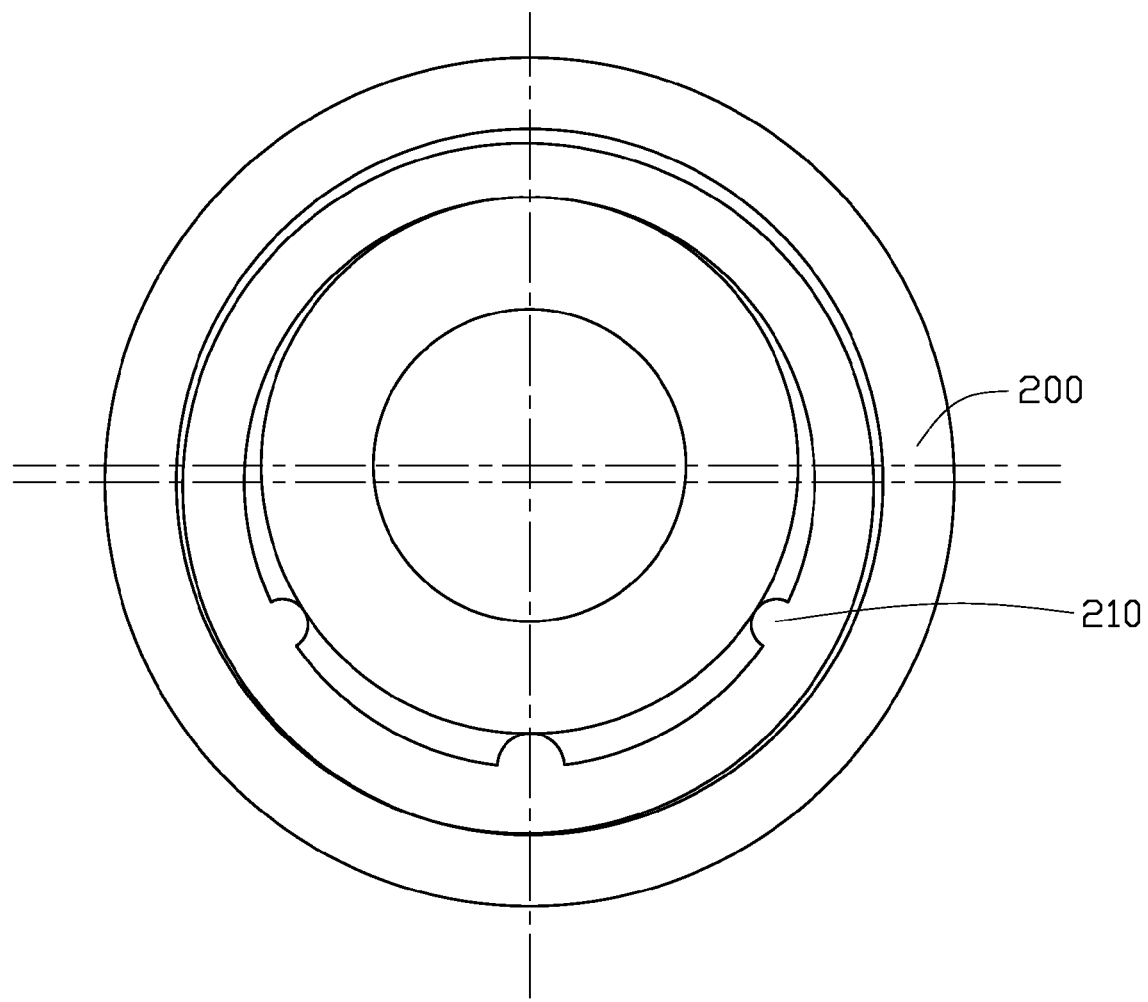
FIG. 4 is a top view of a barrel for aligning respective optical axes of a plurality of lenses assembled in the barrel, according to a second embodiment; and, FIG. 5 is a longitudinal section view of a conventional barrel for aligning respective optical axes of a plurality of lenses received in the barrel.
Figure 5:
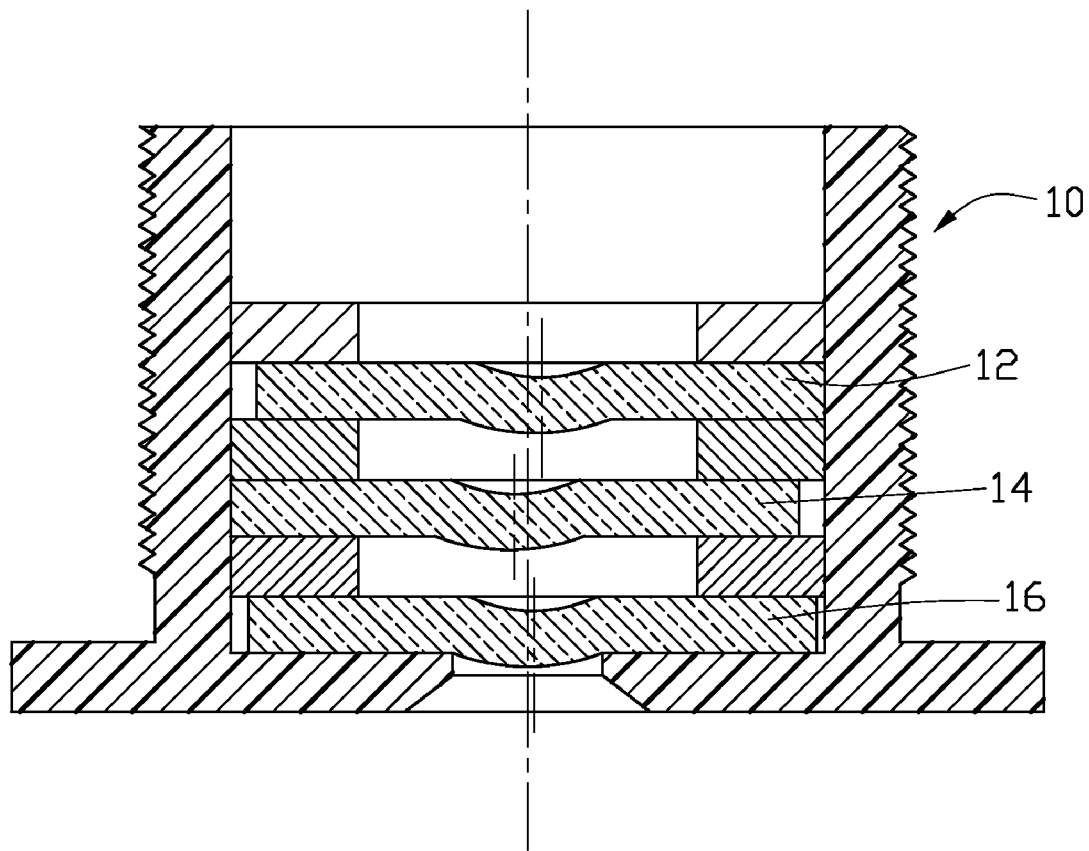

Referring to FIGS. 3, 4 and 5, in assembly, a first lens 31, a first spacer 32, a second lens 33, a second spacer 34, a third lens 35, and a third spacer 36 are placed, in order, into the barrel 20, with adjacent such elements contacting one another. A diameter of the first third lens 31 is substantially equal to a diameter of the second and third lenses 33, 35. An internal diameter of the barrel 20 is slightly greater than the diameter of the first, second, and third lenses 31, 33, 35. That is, there is a bit of a clearance between the barrel 20 and the first, second, and third lenses 31, 33, 35. When the first, second, and third lenses 31, 33, 35 are disposed in the barrel 20, an outer edge of each of the first, second, and third lenses 31, 33, 35 is elastically resisted by at least one of the protruding ribs 21 (likely resisted by both, as shown per FIG. 3) of the barrel 20, thereby holding the first, second, and third lenses 31, 33, 35 at a tangent to an inner surface of the barrel (at a position essentially opposite the composite center of the at least one protruding rib 21). Thus, the first, second, and third lenses 31, 33, 35 are placed into the barrel 20, and all the optical axes of the first, second, and third lenses 31, 33, 35 are oriented towards/in the same direction, because of the alignment forced by the at least one protruding rib 21. Therefore, the positional deviation between the optical axes of the first, second, and third lenses 31, 33, 35 is retained within an allowable tolerance range. That is, the optical axes of the first, second, and third lenses 31, 33, 35 overlap to form a common optical axis 28. A distance between the axis 24 of the barrel 20 and the common optical axis 38 is also within an allowable tolerance range.

Referring to FIG. 4, a barrel for automatically aligning respective optical axes of a plurality of lenses, according to a second present embodiment, is similar to the first present embodiment. However, a barrel 200 in the second embodiment has one more protruding rib 210 than the barrel 20 has in the first embodiment, and the extra protruding rib 210 is formed on an inner surface of the barrel 210 between the two protruding ribs 210 and is configured for more stably supporting the first, second, and third lenses 31, 33, 35.

The first lens 31, the first spacer 32, the second lens 33, the second spacer 34, the third lens 35, and the third spacer 36 are placed, in that order, in the barrel 20. The elastic protruding ribs 21 laterally support the lenses 31, 33, 35 to urge the lenses to deviate towards/in the same direction, thereby forming/ensuring the alignment of their respective optical axes along a common optical axis. Thus, the potential for an uncertain positional deviation between/among the respective optical axes of the lenses 31, 33, 35 is overcome. Therefore, the image resolution and the ratio of acceptable products are improved, and, accordingly, the manufacturing cost is dramatically reduced.

In addition, one protruding rib, four spaced protruding ribs, five spaced protruding ribs and so on, may be formed on the inner surface of the barrel depending on requirement. These protruding ribs cooperatively support and orient the lenses towards the same direction (i.e., along essentially the same tangential line of the barrel), thereby urging the axes of the lenses to overlap and thus align.

While certain embodiment has been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A barrel for automatically aligning respective axes of a plurality of lenses, comprising:
   a main body configured for receiving the plurality of lenses therein, the main body having a main body axis; and
   a pair of protruding ribs formed on an internal surface of the main body, each protruding rib extending along the internal surface of the main body and parallel to the main body axis, each protruding rib thereby being configured for supporting the plurality of lenses thereon and for automatically aligning respective the optical axes of the plurality of lenses, wherein a first imaginary line is formed by perpendicularly connecting one of the protruding ribs and the main body axis of the barrel, a second imaginary line is formed by linearly connecting the other protruding rib and the main body axis of the barrel, and an included angle between the first imaginary line and the second imaginary line is about between 60 degrees and 150 degrees.

2. The barrel as claimed in claim 1, wherein the included angle between the first imaginary line and the second imaginary line is about 120 degrees.

3. The barrel as claimed in claim 1, wherein the pair of protruding ribs elastically supports the plurality of lenses.

4. The barrel as claimed in claim 1, wherein a cross section of each of the protruding ribs is an arcuate shape.

5. A lens module comprising:
   a barrel having a main body, the main body defining an internal surface and a main body axis; and
   a plurality of lenses received in the main body, each lens having a respective optical axis;
   wherein at least one protruding rib is formed on the internal surface of the main body and extends along the internal surface of the main body and parallel to the main body axis, the at least one protruding rib supports the plurality of lenses thereon and automatically aligns the respective optical axes of the plurality of lenses, the optical axes of the plurality of lenses align to form a common optical axis, and the common optical axis is noncollinear with the main body axis.

6. The lens module as claimed in claim 5, wherein the internal surface of the main body has a pair of protruding ribs formed thereon, a first imaginary line is formed between one of the protruding ribs and the main body axis, a second imaginary line is formed between the other protruding rib and the main body axis, an included angle is defined between the first imaginary line and the second imaginary line, and the included angle is about between 60 degrees and 150 degrees.

7. The lens module as claimed in claim 6, wherein the included angle between the first imaginary line and the second imaginary line is about 120 degrees.

8. The lens module as claimed in claim 5, wherein the at least one protruding rib elastically supports the plurality of lenses.

9. The lens module as claimed in claim 5, wherein a cross section of each protruding rib is arcuate in shape.

10. A lens module comprising: a barrel having a main body, the main body defining an internal surface and a main body axis; and a plurality of lenses received in the main body, each lens having a respective optical axis; wherein a pair of protruding ribs is formed on the internal surface of the main body and extends along the internal surface of the main body parallel to the main body axis, the protruding ribs supports the plurality of lenses thereon and aligns the respective optical axes of the plurality of lenses, a first imaginary line is formed between one of the protruding ribs and the main body axis, a second imaginary line is firmed between the other protruding rib and the main body axis, an included angle is defined between the first imaginary line and the second imaginary line, and the included angle between the 60 degrees and 150 degrees.

11. The lens module as claimed in claim 10, wherein the included angle between the first imaginary line and the second imaginary line is about 120 degrees.

12. The lens module as claimed in claim 10, wherein the protruding rib ribs elastically support the plurality of lenses.

13. The lens module as in claim 10, wherein a cross section of each of the protruding ribs is arcuate in shape.

14. The lens module as claimed in claim 10, wherein the optical axes of the plurality of lenses align to form a common optical axis, and the common optical axis is noncollinear with the main body axis.

* * * * *